US010346849B2

(12) United States Patent
Ionescu et al.

(10) Patent No.: US 10,346,849 B2
(45) Date of Patent: Jul. 9, 2019

(54) COMMUNICATING PERSONALIZED MESSAGES USING QUICK RESPONSE (QR) CODES

(75) Inventors: Stefan Ionescu, Stony Brook, NY (US); Steven L. Greenspan, Scotch Plains, NJ (US); Vincent R. Re, Saint James, NY (US); Wei-Jun Kong, Bethpage, NY (US); Nagavardhan Sogal, South Setauket, NY (US); Esin Kiris, Holmdel, NJ (US)

(73) Assignee: CA, Inc., New York, NY (US)

( * ) Notice: Subject to any disclaimer, the term of this patent is extended or adjusted under 35 U.S.C. 154(b) by 1206 days.

(21) Appl. No.: 13/547,819

(22) Filed: Jul. 12, 2012

(65) Prior Publication Data

US 2013/0018726 A1 Jan. 17, 2013

Related U.S. Application Data

(60) Provisional application No. 61/507,071, filed on Jul. 12, 2011.

(51) Int. Cl.
*G06Q 30/00* (2012.01)
*G06Q 30/02* (2012.01)

(52) U.S. Cl.
CPC .................................. *G06Q 30/00* (2013.01)

(58) Field of Classification Search
CPC .................................................... G06Q 30/00
USPC ..................................................... 705/26.5
See application file for complete search history.

(56) References Cited

U.S. PATENT DOCUMENTS 7,490,134 B2 2/2009 Ono et al. .................... 709/217
7,502,133 B2 3/2009 Fukunaga et al. ........... 358/1.15
7,739,201 B2 6/2010 Witmond et al. ............ 705/333
8,444,048 B1 * 5/2013 Nidamarthi et al. ......... 235/375
2005/0288938 A1 12/2005 Date et al. ........................ 705/1
2006/0007921 A1 1/2006 Shimomura .................. 370/352
(Continued)

FOREIGN PATENT DOCUMENTS

JP 2010-272099 12/2010 ............ G06Q 50/00
JP 2011-078071 4/2011 ............ G06F 13/00
(Continued)

OTHER PUBLICATIONS

Comparison of Different Approaches for Mobile Advertising (Rebeccas Bulander, Michael Decker, Gunther Schiefer, Jul. 2005).*

*Primary Examiner* — Victoria E Frunzi
(74) *Attorney, Agent, or Firm* — Baker Botts L.L.P.

(57) ABSTRACT

In some embodiments, a method includes receiving an identification of an intended recipient of a physical package and a personalized message having content based on the identity of the intended recipient. The method further includes identifying a uniform resource locator (URL) comprising a reference to a webpage that displays the personalized message and one or more advertisements regarding products or services related to the physical package. A Quick Response (QR) code encoding the URL comprising the reference to the webpage that displays the personalized message and the one or more advertisements may be generated. The method further includes transmitting the personalized message and the one or more advertisements to the intended recipient via the webpage in response to the intended recipient accessing the URL encoded by the QR code.

12 Claims, 3 Drawing Sheets

(56) References Cited

U.S. PATENT DOCUMENTS

| | | | | |
|---|---|---|---|---|
| 2009/0108057 | A1 | 4/2009 | Mu et al. | 235/375 |
| 2010/0187301 | A1 | 7/2010 | Liu | 235/380 |
| 2010/0290613 | A1 | 11/2010 | Tsai et al. | 379/216.01 |
| 2011/0010971 | A1 | 1/2011 | Erickson et al. | 40/300 |
| 2011/0043858 | A1 | 2/2011 | Jetter | 358/1.15 |
| 2011/0066692 | A1* | 3/2011 | Ciancio-Bunch et al. | 709/206 |
| 2011/0125870 | A1 | 5/2011 | Matsumoto | 709/217 |
| 2011/0137706 | A1 | 6/2011 | Howard et al. | 705/7.29 |
| 2011/0270688 | A1 | 11/2011 | Dew et al. | 705/14.69 |
| 2011/0283172 | A1 | 11/2011 | Berger et al. | 715/202 |
| 2011/0320348 | A1 | 12/2011 | Kaneuchi | 705/39 |
| 2012/0181330 | A1* | 7/2012 | Kim | 235/375 |

FOREIGN PATENT DOCUMENTS

| | | | |
|---|---|---|---|
| JP | 2011-096217 | 5/2011 | G06F 13/00 |
| JP | 2011-159016 | 8/2011 | B42D 11/00 |

* cited by examiner

COMMUNICATING PERSONALIZED MESSAGES USING QUICK RESPONSE (QR) CODES

RELATED APPLICATION

This application claims benefit under 35 U.S.C. § 119(e) of U.S. Provisional Application Ser. No. 61/507,071, entitled "SYSTEM AND METHOD FOR USING QR CODES," filed Jul. 12, 2011.

TECHNICAL FIELD

The present disclosure relates to communication techniques and more specifically to communicating personalized messages using quick response (QR) codes.

BACKGROUND

A Quick Response (QR) code is a two-dimensional barcode that can be scanned by any of a variety of devices capable of optical recognition, such as purpose built scanners, computers or smart phones connected to or comprising a camera. In situations in which the QR code is being scanned by a smart phone, the contents of the QR code may be interpreted by a mobile application running on the smart phone. In some scenarios, based on the content of the QR code, the device scanning the QR code can navigate to an URL embedded in the QR code to access content including but not limited to media files. The QR code may also directly download or present the media files without navigating to a URL. In some embodiments, the QR codes may be used to initiate contact (e.g., email, phone, text, instant message, etc.) with a company representative or to load an application provided by the company.

SUMMARY

In some embodiments, a method includes receiving an identification of an intended recipient of a physical package and a personalized message having content based on the identity of the intended recipient. The method further includes identifying a uniform resource locator (URL) comprising a reference to a webpage that displays the personalized message and one or more advertisements regarding products or services related to the physical package. A Quick Response (QR) code encoding the URL comprising the reference to the webpage that displays the personalized message and the one or more advertisements may be generated. The method further includes transmitting the personalized message and the one or more advertisements to the intended recipient via the webpage in response to the intended recipient accessing the URL encoded by the QR code.

Certain embodiments may provide one or more technical advantages. A technical advantage of one embodiment may include the capability to transmit a QR code from a sender to an intended recipient that contains a message, the content of which is based on the identity of the intended recipient. A technical advantage of one embodiment may include the capability to discern information about the intended recipient and/or about a physical package transmitted with the QR code based on scanning of the QR code by the intended recipient. A technical advantage of one embodiment may include the capability to receive and deliver responses messages from the receiver of the QR code.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description taken in conjunction with the accompanying drawings, in which.

DETAILED DESCRIPTION

Teachings of certain embodiments recognize the capability to use Quick Response (QR) codes as a communication medium for transmitting personalized messages from a sender to an intended recipient. A personalized message is a message created by a sender for delivery to an intended recipient. The personalized message may be personalized for the intended recipient by including content based on the identity of the intended recipient. For example, a husband, Henry, may send personalized messages to his wife, Wilma, on her birthday. Example personalized messages in this scenario may include: "Happy Birthday," "Happy Birthday, Wilma," and "Happy Birthday to my loving wife." Each of these example personalized messages includes content based on the identity of the intended recipient, Wilma, by referring to Wilma's birthday.

If Henry wants to send Wilma a gift (such as flowers or candy), certain embodiments may allow Henry to have a personalized message delivered with that gift. Henry may use a service, such as a service offered by a merchant or delivery company associated with the gift (the service may be provided directly by the merchant or delivery company or it may be provided by a third party such as a cloud service provider), to associate the personalized message to a QR code. By using a QR code rather than or in addition to a typical greeting card, Henry may send a personalized message containing media such as audio or video. For example, Henry may record himself saying "Happy Birthday Wilma" on video, and the QR code may include a link to this video. When Wilma receives the gift and scans the QR code on the card, Wilma may receive the personalized message by, for example, downloading a media file, or watching/listening/reading the message from her browser (e.g., via streaming) or within a smart phone application.

Figure 1:
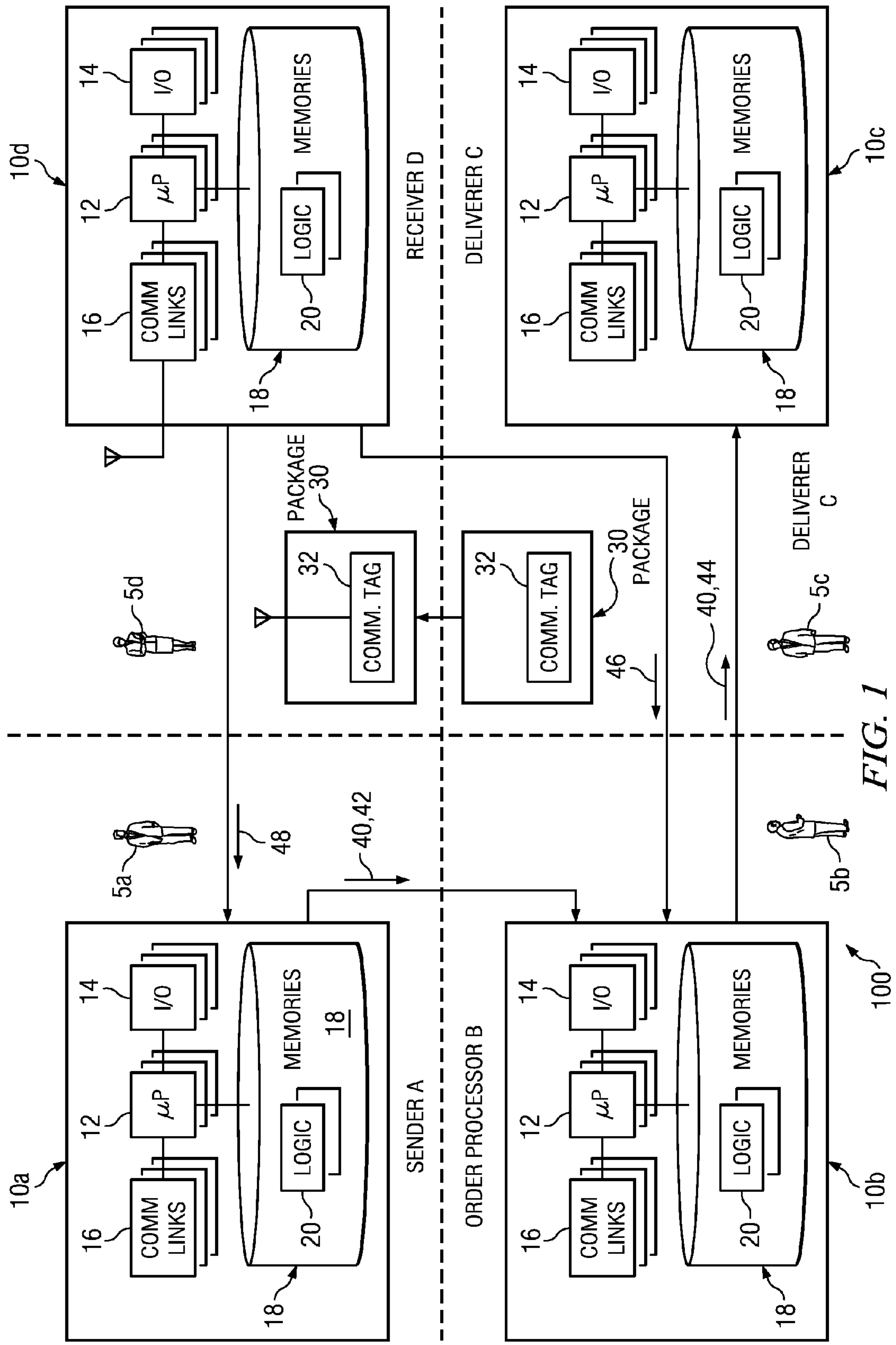
FIG. 1 shows a delivery system for delivering a physical package and a message according to one example embodiment.

FIG. 1 shows a delivery system 100 according to one embodiment. The delivery system 100 of FIG. 1 includes four entities: sender A, order processor B, deliverer C, and receiver D. In some embodiments, however, delivery system 100 may include more, fewer, or different entities. For example, in some embodiments, the actions of order processor B and deliverer C may be performed may the same entity.

In the example of FIG. 1, each entity includes a user 5 and a computer system 10. Users 5 may include any individual, group of individuals, and/or entity that interacts with computer system 10. Examples of users 5 include, but are not limited to, a sender, a recipient, an employee, manager, executive, accountant, engineer, technician, contractor, agent, and/or customer. Users 5 may be associated with a business or other organization. FIG. 1 shows four example users 5*a*-5*d* associated with entities A-D. Each computer system 10 may include processors 12, input/output devices 14, communications links 16, and memory 18 having logic 20 stored therein. In other embodiments, computer system 10 may include more, fewer, or other components. Examples of processors 12, input/output devices 14, communication links 16, memory 18, and logic 20 are described in greater detail below.

Package 30 is a physical package to be delivered to receiver D. For example, package 30 may represent a gift that Henry wishes to send to his wife, Wilma. In the example of FIG. 1, package 30 is delivered with a communication tag 32. Communication tag 32 provides a mechanism for delivering personalized message to receiver D. In one example embodiment, communication tag 32 is a two-dimensional barcode, such as a QR code. As described above, QR code is a two-dimensional bar-code that can be scanned by any of a variety of devices capable of optical recognition, such as purpose built scanners, computers or smart phones connected to or comprising a camera. In situations in which the QR code is being scanned by a smart phone, the contents of the QR code may be interpreted by a mobile application running on the smart phone. In some scenarios, based on the content of the QR code, the device scanning the QR code can navigate to an URL embedded in the QR code to access content including but not limited to media files. The QR code may also directly download or present the media files without navigating to a URL. In some embodiments, the QR codes may be used to initiate contact (e.g., email, phone, text, instant message, etc.) with a company representative or to load an application provided by the company.

In some embodiments, the QR code may be unique to the recipient/message and may be printed on a card that is attached to package 30. The QR code may be selected from among a plurality of pre-generated QR codes. In certain embodiments, sender A may personally select the card with the QR code (e.g., where the user is purchasing the gift from a brick and mortar merchant, the merchant may have several printed QR codes on hand that sender A would select from), or an employee of the merchant or delivery company may select the card with the QR code without sender A ever seeing the card. In some embodiments, the QR code may be created when the message is uploaded or when sender A has indicated that he/she wishes to include the personalized message. In some scenarios, sender A may print the QR code once it has been created. In certain scenarios, the QR code may be printed by the service provider and attached to package 30.

In another example embodiment, communication tag 32 is a near-field communication (NFC) device. NFC is a wireless technology that is used to exchange data between devices in very close proximity (2" or less). Like QR codes, NFC may be capable of transmitting a personalized message. QR codes and NFC may both be used to augment retail transactions. This may be done by extending existing products or providing new products altogether. For example a new type of product would be social expressions artifacts (greeting cards, wrapping paper, gift cards, gift card holders etc.) that include a pre-printed QR code that is customizable by an end user (e.g., the user who is purchasing the gift for another user). The purchasing user may be given the option to personalize such gifts through media files accessible through QR codes that are manufactured (printed) at very high standards (quality, consistency, artistic value, etc.) and included with the gift purchased by the purchasing user.

In operation, according to one example embodiment, sender A sends a request 40 and a message 42 to order processor B. Request 40 includes an identification of an intended recipient (receiver D) and a request to transmit a package (package 30) to the intended recipient (receiver D). Message 42 is a message from sender A that will accompany package 30 when package 30 is delivered to receiver D. Sender A may personalize message 42 for the intended recipient (receiver D) if sender A knows the identity of the intended recipient. For example, sender A may include content in message 42 that is based on the identity of receiver D.

Order processor B receives request 40 and message 42. In some embodiments, order processor B may store message 42 and generate a link 44. Link 44 may represent a link to a webpage that displays the stored message 42. In one example embodiment, link 44 is a URL. Order processor B may transmit link 44 with request 40 to deliverer C.

Deliverer C receives request 40 and link 44 and transmits package 30 and communication tag 32 to the intended recipient identified by sender A in request 40 (receiver D). In one example embodiment, communication tag 32 is a two-dimensional barcode, such as a QR code.

Receiver D receives package 30 and communication tag 32. Receiver D may scan communication tag 32 to reveal message 42. For example, receiver D may scan communication tag 32 to retrieve link 44 and then execute link 44 to retrieve message 42. In this example, executing link 44 may cause computer system 10*d* to display a webpage containing message 42.

In some embodiments, the webpage displaying message 42 to receiver D may allow receiver D to provide feedback 46 and/or a response message 48. Feedback 46 may include information from receiver D regarding package 30, deliverer C, and/or receiver D. In some embodiments, receiver D may provide feedback to order processor B. For example, feedback 46 may include information indicating that package 30 has been delivered to receiver D. In this example, feedback 46 may be automatically transmitted when receiver D opens the webpage such that receiver D is not require to provide additional input. This example may allow order processor B to track deliveries of packages 30. In another example, feedback 46 may include information regarding the quality of package 30. For example, if package 30 is a gift of flowers, receiver D may provide feedback 46 indicating whether the flowers were missing any petals. In yet another example, feedback 46 may include information assessing the professionalism and quality of deliverer C. In yet another example, feedback 46 may include additional information identifying receiver D to order processor B. For example, feedback 46 may include an email address for receiver D, which order processor B may use to advertise additional products and services to receiver D. Order processor B may also advertise additional products and services directly through the webpage. In particular embodiments, feedback 46 includes personal information, such as a name, address, telephone number, credit card number, or other suitable information of receiver D and feedback 46 may be used to open an account for receiver D with order processor B or a merchant associated with order processor B. Feedback 46 may also include one or more orders for a product advertised by order processor B via the webpage displaying message 42, such as a gift for sender A.

Response message 48 may represent a message transmitted from receiver D to sender A in response to message 42. In some embodiments, receiver D may upload a response message 48 to the webpage, and order processor B may forward the response message 48 to sender A. In some embodiments, order processor B may forward the response message 48 to sender A via an email and/or a link to a webpage displaying response message 48.

In some embodiments, communication tags 32 may also be used by a manufacturer or retailer to streamline the product registration, including gathering end-user information, and/or provide a personalized support experience for any technical issues. In situations in which communication tags 32 are being used for new product registration, a communication tag 32 may be attached to or associated with an indicator of the product that is unique to that product (e.g., communication tag 32 may be associated with the model, serial number, date built, manufacturing plant/line, inspector ID, retailer, etc.), the end-user will scan communication tag 32 with a mobile device, download the mobile app or be taken to an appropriate webpage, and complete the process without having to type-in the product info. In situations where communication tag 32 is delivered with a gift via a delivery service, the accessing of communication tag 32 may be used to track how quickly the product is actually received by the intended recipient. In some embodiments, communication tags 32 may be used by a manufacturer to provide instructional content associated to the product itself. In some instances, this may be a webpage or document that the user can download (e.g., installation instructions or videos). In some instances, the smart phone application may provide more specific information or an interactive application based on the product identified via communication tag 32. This may allow the manufacturer to provide customized and user/product specific support. In some instances, the first time a communication tag 32 associated with a product is scanned, the user may be prompted to register their ownership of the product, each subsequent scan of communication tag 32 may provide technical support or product information that is specific to the registered product (e.g., warranty information, trouble shooting, contact numbers, etc.).

The manufacturers may also use the unique communication tags 32 to provide a maintenance/repair program that is based on the unique communication tags 32 associated with their products. For example, through a communication tags 32 attached to a product, an end-user can start an application that would allow him to order replacement parts, find dealers/service shops nearby, order add-ons, schedule a service, download manuals, FAQs, start chart-sessions with tech-support, etc.

In some instances, communication tags 32 could be used for transportation tickets/fees, parking fees, event tickets etc. For example railroad tickets could be bought at the train station or on the train itself by scanning a communication tag 32. A similar mechanism could be used for parking fees, where an additional advantage would be provided by the mobile app notifying the user when the paid time is about to expire and providing the option to buy extra time.

In particular embodiments, a first webpage that is accessed by scanning a communication tag 32 may redirect the user to another webpage based on one or more factors. Examples of such factors include the time that the first webpage is accessed, the location of the user when the first webpage is accessed, the identity of the user, a profile of the user (e.g., the profile may include one or more interests of the user), or whether there has been an information update of a product or service associated with the communication tag 32. As an example, scanning a communication tag 32 associated with an airline ticket may redirect a user's browser to a seat confirmation page and boarding pass printing page if the communication tag 32 is scanned within 24 hours of the flight departure, but to a different page (such as a flight information or seat selection page) if the ticket is scanned before that time.

The content provided by a webpage to a user that scans a communication tag 32 may also change over time. For example, a 10-year work anniversary gift may be updated yearly by associating the communication tag 32 with new photos or videos from co-workers. In particular embodiments, the user's device may be registered or cookies may be used by the device's browser to provide access to updates made to a webpage associated with communication tag 32.

In a particular embodiment, if the same communication tag 32 is attached to multiple gifts given to multiple recipients, the communication tag 32 may be used to reference a wiki or blog that allows all the recipients to enter feedback (e.g., video response messages, pictures, or text) and read the feedback that others have entered.

Certain embodiments may provide users with the ability to access, create, and/or track messages from a user's device through communication tags 32. The communication tags 32 are unique to each recipient. Thus, by scanning communication tag 32, the user's device is able to access a prerecorded message 42 without having to enter a URL or any kind of ID/code number associated with message 42. In some embodiments, additional security could be provided by associating communication tag 32 with the recipient's identity (e.g., a Facebook account, email address, etc.). This may provide additional security over some gift card services in which all someone needs to access a message is an ID/code number associated with the message.

In certain embodiments, the process of storing messages 42 and managing access may be provided as a cloud service that is offered to merchants as low risk, low entry-cost business opportunity with a pay-as-you-go model.

As stated above, each entity of FIG. 1 may include a computer system 10. Each computer system 10 may include processors 12, input/output devices 14, communications links 16, and memory 18 having logic 20 stored therein. In other embodiments, computer system 10 may include more, less, or other components. Computer system 10 may be operable to perform one or more operations of various embodiments. The components of computer system 10 may comprise any suitable physical form, configuration, number, type and/or layout. As an example, and not by way of limitation, computer system 10 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. In some embodiments, computer system 10 may be a mobile device, such as a mobile telephone (e.g., feature phones and smart phones), PDA, and mobile computer (e.g., tablet and netbook).

Processors 12 represent one or more tangible hardware devices operable to execute logic contained within a medium. In particular embodiments, processor 12 includes hardware for executing instructions, such as those making up a computer program. As an example and not by way of limitation, to execute instructions, processor 12 may retrieve (or fetch) the instructions from an internal register, an internal cache, or memory 18; decode and execute them; and then write one or more results to an internal register, an internal cache, or memory 18. In particular embodiments, processor 12 may include one or more internal caches for data, instructions, or addresses. This disclosure contemplates processor 12 including any suitable number of any suitable internal caches, where appropriate. As an example and not by way of limitation, processor 12 may include one or more instruction caches, one or more data caches, and one or more translation lookaside buffers (TLBs). Instructions in the instruction caches may be copies of instructions in memory 18, and the instruction caches may speed up retrieval of those instructions by processor 12. Data in the data caches may be copies of data in memory 18 for instructions executing at processor 12 to operate on; the results of previous instructions executed at processor 12 for access by subsequent instructions executing at processor 12 or for writing to memory 18; or other suitable data. The data caches may speed up read or write operations by processor 12. The TLBs may speed up virtual-address translation for processor 12. In particular embodiments, processor 12 may include one or more internal registers for data, instructions, or addresses. This disclosure contemplates processor 12 including any suitable number of any suitable internal registers, where appropriate. Where appropriate, processor 12 may include one or more arithmetic logic units (ALUs); be a multi-core processor; or include one or more processors 12. Although this disclosure describes and illustrates a particular processor, this disclosure contemplates any suitable processor.

Input/output devices 14 may include any device or interface operable to enable communication between computer system 10 and external components, including communication with a user or another system. Example input/output devices 14 may include, but are not limited to, a QR code scanner, near-field communication (NFC) scanner, a display, keyboard, touch screen, camera, and microphone. Input/output devices 14 may be external to or internal to computer system 10. For example, input/output devices 14 may include both a built-in keyboard, a plug-in keyboard, and a wireless keyboard.

Interfaces 16 are operable to facilitate communication between computer system 10 and another element of a network. Interfaces 16 may connect to any number and combination of wireline and/or wireless networks suitable for data transmission, including transmission of communications. Interfaces 16 may, for example, communicate audio and/or video signals, messages, internet protocol packets, frame relay frames, asynchronous transfer mode cells, and/or other suitable data between network addresses. Interfaces 16 connect to a computer network or a variety of other communicative platforms including, but not limited to, a wireless network, a cellular network, a public switched telephone network (PSTN); a public or private data network; one or more intranets; a local area network (LAN); a metropolitan area network (MAN); a wide area network (WAN); a local, regional, or global communication network; an optical network; a satellite network; a cellular network; an enterprise intranet; all or a portion of the Internet; other suitable interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a memory disk or smart card), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known mobile-device operating systems, such as Blackberry OS, Blackberry Tablet OS, Google Android, Windows Phone, webOS, Symbian OS, Apple iOS, and Samsung's Bada, as well as other operating systems such as 0S2, UNIX, MacOS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Figure 2:
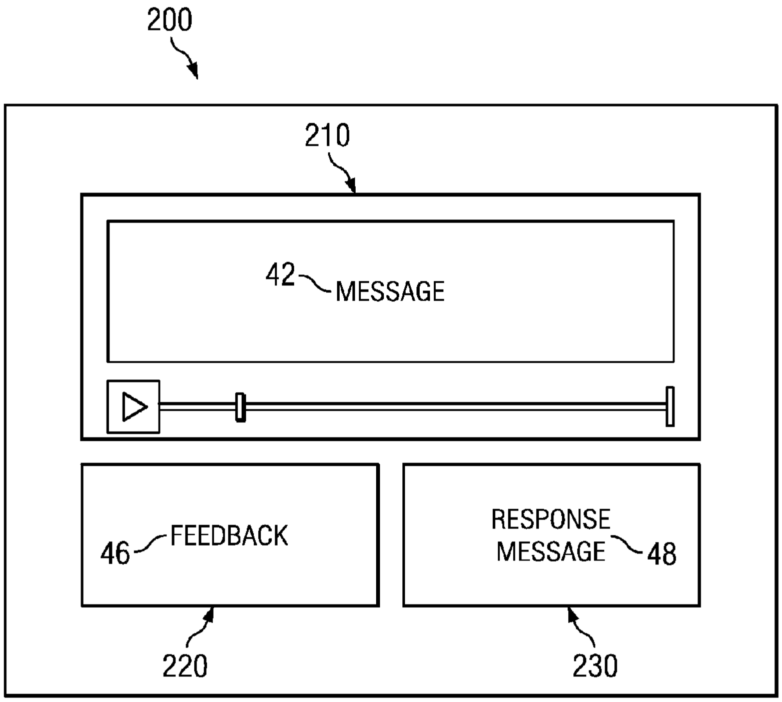
FIG. 2 shows a user interface for delivering the message of FIG. 1 according to one example embodiment.

FIG. 2 shows a user interface 200 according to one example embodiment. In some embodiments, user interface 200 may be implemented by computer system 10. In particular, computer system **10*d* may retrieve a webpage when receiver D scans communication tag 32. The content of this webpage may be provided by order processer B. In the example of FIG. 2, user interface 200 includes a message interface 210, a feedback interface 220, and a response interface 230. Message interface 210 displays message 42. In the example of FIG. 2, message interface 210 displays a video message 42. Feedback interface 220 receives feedback 46 from receiver D. Response interface 230 receives a response message 48 from receiver D. User interface 200 may be associated with logic configured to transmit the received feedback 46 and response message 48** to order processor B and sender A, respectively.

Figure 3:
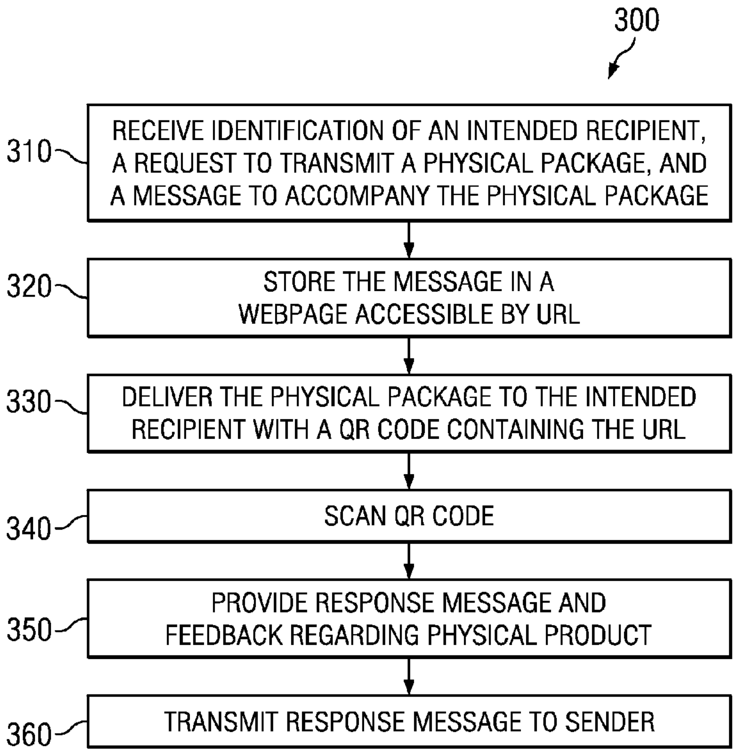
FIG. 3 shows a method for delivering the physical package and message of FIG. 1 according to one example embodiment.

FIG. 3 shows a method 300 for transmitting a message according to one example embodiment. At step 310, order processor B receives identification of an intended recipient, a request to transmit a physical package to the intended recipient, and a message to accompany the physical package to the intended recipient.

In some embodiments, order processor B may provide a smart phone application that may used to upload message 42 and/or receive message 42. This may provide for a simple and user-friendly experience for sender A. In some embodiments, the application may include a QR code scanner. The QR code scanner may scan a QR code that may contain a URL or a unique number. The scanned information may be used to communicate with order processor B. In some embodiments, the smart phone application may include the ability to record message 42 and upload it to order processor B. In some instances, the smart phone application may communicate with order processor B to determine if the user is the sender or the recipient. For example, order processor B may track the number of times that a QR code is accessed. The smart phone application may also be able to display message 42 or otherwise present information to the user.

In some instances, the first time a QR code is scanned, order processor B may recognize that the user performing the scanning is to be the author of message 42. Order processor B may then prompt the user to record or upload a personal message. This may include an audio message, a video message, a picture message, or a text message.

In some embodiments, the user uploading message 42 may be an administrator. As an administrator, the user may be able to perform actions that the intended recipient (non-administrator) can not perform. For example, the administrator may have the ability to remove, delete, change, replace, edit, or otherwise modify message 42. In certain embodiments, a user may be identified as an administrator via a unique administrator PIN number. The PIN number may be supplied by the user or order processor B. In some embodiments, order processor B may prompt the user for a PIN or password the first time the QR code is accessed. In some embodiments, the administrator may be identified by scanning one QR code while the intended recipient scans a different QR code. Both QR codes may be associated with the same message 42, the first QR code allows changes to message 42, the second QR code allows message 42 to be downloaded or viewed. In particular embodiments, the user may be identified as an administrator automatically based on information provided when the QR code is scanned. For example, the user's phone may send the user's phone number, a device identifier, an account name, etc. when the mobile phone communicates with order processor B.

At step 320, order processor B stores the message in a webpage accessible by a URL, such as link 44. In some embodiments, order processor B or deliverer C may generate communication tag 32 containing link 44. In this example embodiment, link 44 may be retrieved when communication tag 32 is scanned. In some embodiments, generating communication tag 32 may include creating a new communication tag 32 after receiving link 44. In other embodiments, generating communication tag 32 may include identifying a pre-generated communication tag 32 from among a group of pre-generated communication tags 32 that contains link 44.

At step 330, the physical package is delivered to the intended recipient with a QR code containing the URL. At step 340, the intended recipient scans the QR code and retrieves the webpage using the URL. At step 350, the intended recipient provides a response message and feedback regarding the physical package through the webpage. At step 360, order processor B receives the response message and feedback and transmits the response message to sender A.

Figure 4:
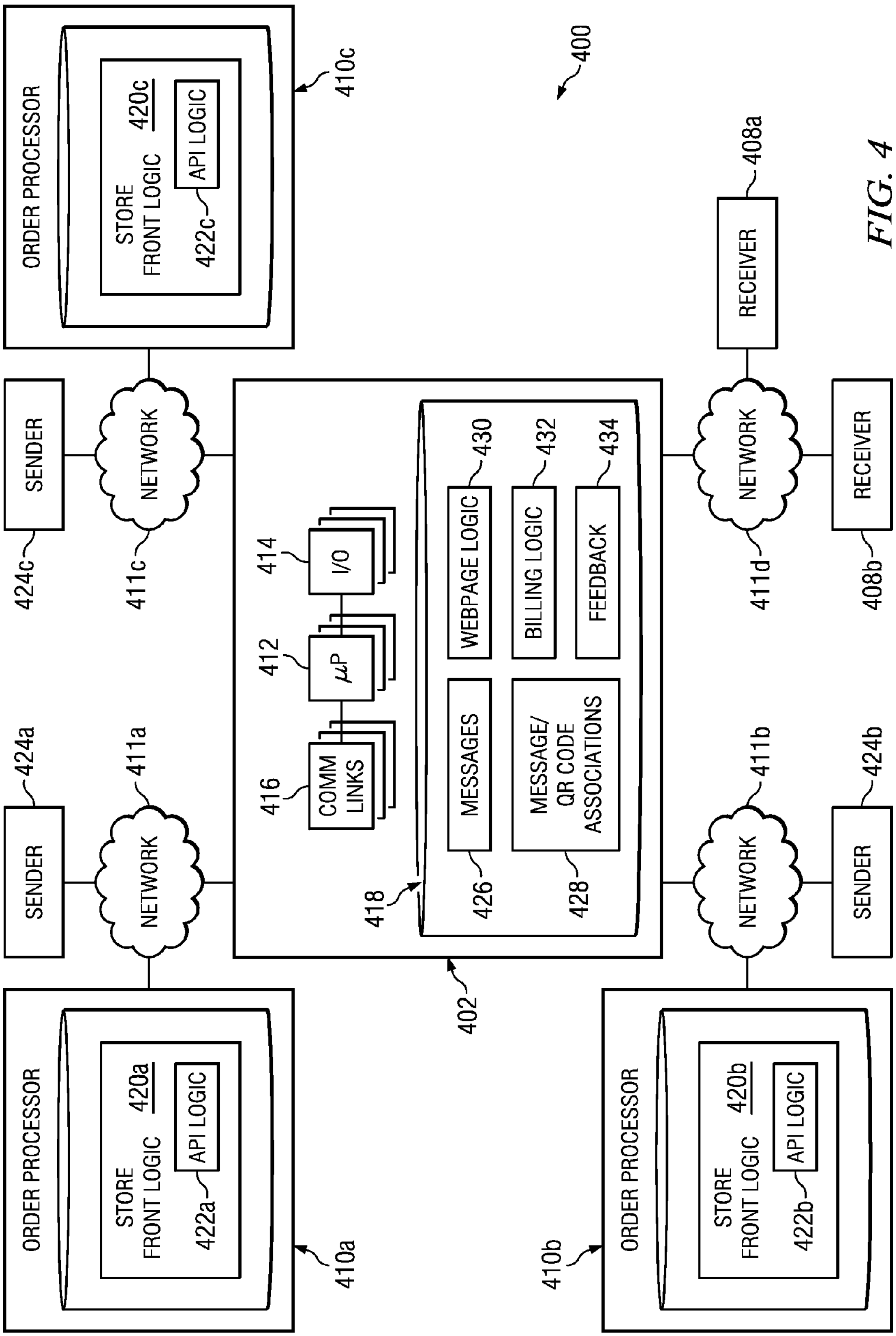
FIG. 4 shows a system for storing and delivering the message of FIG. 1.

FIG. 4 shows a system 400 for storing and delivering messages 42. System 400 includes cloud service provider 402 coupled to order processors 410*a*, 410*b*, and 410*c* via networks 411*a*, 411*b*, and 411*c*, and receivers 408*a* and 408*b* via network 411*d*. Cloud service provider 402 may be capable of storing messages 42 on behalf of multiple order processors 410 and providing the messages to the intended recipients via receivers 408. Cloud service provider 402 may be capable of performing any suitable functions described above that are performed by order processor 10*b* or deliverer 10*c*. Microprocessors 412, input/output devices 414, communication links 416, and memory 418 may include any suitable characteristics of microprocessors 12, input/output devices 14, communication links 16, and memory 18 described above. Order processors 410 may include any suitable components of or be capable of performing any suitable functions of order processor 10*b* as described above. Senders 424 correspond to sender 10*a* and receiver 408 correspond to receiver 10*d*.

Networks 411 of system 400 each represent any suitable network operable to facilitate communication between the components of system 400, such as cloud service provider 402, order processors 410, senders 424, and receivers 408. Network 411 may include any interconnecting system capable of transmitting audio, video, signals, data, messages, or any combination of the preceding. Network 411 may include all or a portion of a public switched telephone network (PSTN), a public or private data network, a local area network (LAN), a metropolitan area network (MAN), a wide area network (WAN), a local, regional, or global communication or computing system network, such as the Internet, a wireline or wireless network, an enterprise intranet, or any other suitable communication link, including combinations thereof, operable to facilitate communication between the components.

In particular embodiments, each order processor 410 is associated with a distinct merchant. For example, order processor 410*a* may correspond to a storefront (e.g., an e-commerce website) of a first company, order processor 410*b* may correspond to a storefront of a second company, and so on. Order processor 410 may include storefront logic 420 that provides information about a plurality of products offered by the respective company and a checkout procedure for customers that purchase items via the storefront. In particular embodiments, the services offered by cloud service provider 402 are easily integrated with existing storefront logic 420 of an order processor 410. In a particular embodiment, the functionality of cloud service provider 402 are accessed via an application programming interface (API) that may be called by multiple order processors 410. API logic 422*a* may be added to the existing storefront logic 420*a* to enable communication between order processor 410*a* and cloud service provider 402. For example, API logic 422*a* may use the API of the cloud service provider 402 to upload a message 42 from a customer to memory 418, to associate a message 42 from a customer with a particular QR code, to retrieve feedback information, or to provide or retrieve other information.

In a particular embodiment, a customer associated with sender 424*a* may purchase a gift for an intended recipient from a merchant associated with order processor 410*a*. As part of the checkout process provided by storefront logic 420*a*, the customer may specify information regarding the recipient and may upload a customized message for the recipient via a user interface. In particular embodiments, the user interface used to upload a video is provided via a webpage by cloud service provider 402 in response to receiving a request from API logic 422*a*. Message 42 may be transmitted from sender 424*a* to cloud service provider 402 directly (e.g., via network 411*a*) or through order processor 410*a*.

In a particular embodiment, a customer may purchase a card or other product that includes a QR code. The customer may scan the QR code (e.g., using a smartphone) to access a webpage that includes a user interface provided by cloud service provider for uploading a message. The user may then upload a message that is stored in memory 418 and associated with the QR code. Cloud service provider 402 may provide this service for multiple different merchants that sell products with QR codes.

Cloud service provider 402 is operable to store the uploaded message 42 in memory 418 for later retrieval by the recipient. Cloud service provider 402 may also store associations between the message 42 and a QR code that is sent with the purchased gift to the recipient. In particular embodiments, the QR code itself may be linked to the message 42 in memory 418. In other embodiments, an identifier such as a URL that is encoded by the QR code is linked with the message 42.

When the recipient of the gift accesses the QR code via receiver 408 (e.g., browses to a URL encoded in the QR code), cloud service provider 402 is operable to transmit the message 42 that is associated with the QR code to receiver 408. In a particular embodiment, cloud service provider 402 utilizes webpage logic 430 to establish a web page with a URL that matches a URL encoded in the QR code and provides message 42 to the recipient via the web page. Receiver 408 may communicate with cloud service provider via network 411*d* to access the message.

Cloud service provider 402 may also associate an identifier of the merchant that sold the gift with the QR code that is attached to the gift. This association may be performed at any suitable time. For example, the association may be made before the QR code is generated. Thus, if the QR code is generated by the cloud service provider 402, the merchant identifier may be associated with the QR code and then the QR code may be provided to the merchant (e.g., via order processor 410). In a particular embodiment, the merchant identifier is encoded within the QR code. The merchant identifier could alternatively be associated with the QR code at the time of sale. For example, order processor 410 may send cloud service provider 402 a request for a QR code to attach to a purchased gift. The request may include the identifier of the merchant.

Association between the merchant identifier and the QR code enables billing logic 432 of cloud service provider 402 to track the number of transactions performed for each merchant. For example, billing logic 432 may track the number of QR codes that are generated for a particular merchant and/or the number of messages 42 that are accessed by recipients of gifts purchased from the merchants.

Accordingly, an entity associated with cloud service provider 402 may bill the merchants on a per transaction basis.

In particular embodiments, the recipient may use the webpage that displays the message 42 to provide feedback to the merchant. The feedback may be associated with the identifier of the merchant, such that each merchant may access its associated feedback from cloud service provider 402. The recipient may also use the webpage to provide a response message that is sent to the sender by cloud service provider 402.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

What is claimed is:

1. A method, comprising:

receiving an identification of an intended recipient of a physical package and a first personalized message having content based on the identity of the intended recipient;

identifying a uniform resource locator (URL) comprising a reference to a first webpage that displays the first personalized message;

generating, by one or more processors, a Quick Response (QR) code encoding the URL comprising the reference to the first webpage that displays the first personalized message;

determining an access time of the intended recipient accessing the URL encoded by the QR code;

determining whether the access time of the intended recipient is prior, equal to, or after a predetermined time;

transmitting the first personalized message to the intended recipient via the first webpage when the access time is prior or equal to the predetermined time;

redirecting the intended recipient from the first webpage to a second webpage that displays a second personalized message when the access time is after the predetermined time, wherein the second personalized message is distinct from the first personalized message; and wherein the first personalized message is received from a sender, the method further comprising receiving, through the first webpage, a personalized response message to the sender from the intended recipient in response to the first personalized message.

2. The method of claim 1, wherein the first personalized message is a video message.

3. The method of claim 1, further comprising:

receiving a request to transmit the physical package with the first personalized message to the intended recipient; and sending the QR code for inclusion with the physical package when the physical package is transmitted to the intended recipient.

4. The method of claim 1, further comprising receiving a message indicating that the intended recipient has received the physical package, the message transmitted in response to the intended recipient accessing the URL encoded by the QR code.

5. The method of claim 1, further comprising providing, through the first webpage, an interface for receiving feedback from the intended recipient regarding the physical package.

6. A system, comprising:

a memory storing an identification of an intended recipient of a physical package and a first personalized message having content based on the identity of the intended recipient; and a processor, communicatively coupled to the memory, the processor configured to:

identify a uniform resource locator (URL) comprising a reference to a first webpage that displays the first personalized message;

generate a Quick Response (QR) code encoding the URL comprising the reference to the first webpage that displays the first personalized message;

determine an access time of the intended recipient accessing the URL encoded by the QR code;

determine whether the access time of the intended recipient is prior, equal to, or after a predetermined time;

transmit the first personalized message to the intended recipient via the first webpage when the access time is prior or equal to the predetermined time;

redirect the intended recipient from the first webpage to a second webpage that displays a second personalized message when the access time is after the predetermined time, wherein the second personalized message is distinct from the first personalized message; and wherein the first personalized message is received from a sender, the method further comprising receiving, through the first webpage, a personalized response message to the sender from the intended recipient in response to the first personalized message.

7. The system of claim 6, wherein the first personalized message is a video message.

8. The system of claim 6, the processor further configured to:

receive a request to transmit the physical package with the first personalized message to the intended recipient; and send the QR code for inclusion with the physical package when the physical package is sent to the intended recipient.

9. The system of claim 6, wherein the processor is further configured to receive an order from the intended recipient via the first webpage.

10. The system of claim 9, wherein the first personalized message is received from a sender and the processor is further configured to receive an order via the first webpage from the intended recipient for a gift for the sender.

11. The system of claim 6, the processor further configured to receive a message indicating that the intended recipient has received the physical package, the message transmitted in response to the intended recipient accessing the URL encoded by the QR code.

12. The system of claim 6, the processor further configured to provide, through the first webpage, an interface for receiving feedback from the intended recipient regarding the physical package.

* * * * *